(12) United States Patent
Simon et al.

(10) Patent No.: US 6,344,901 B1
(45) Date of Patent: Feb. 5, 2002

(54) METHOD AND APPARATUS FOR USING A RASTERIZER AND A PRINT ENGINE OF INCOMPATIBLE BIT-DEPTH REPRESENTATION

(75) Inventors: Tan Lian Chye Simon; Chua Wei Wei Wilson, both of Singapore (SG)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/174,809

(22) Filed: Oct. 19, 1998

(51) Int. Cl.[7] .................................................. H04N 1/46
(52) U.S. Cl. ........................ 358/1.9; 358/1.9; 358/1.1; 358/456; 358/534; 358/523; 358/298
(58) Field of Search ......................... 358/1.9, 1.1, 455, 358/456, 534, 535, 536, 298, 518, 523; 382/162, 167

(56) References Cited

U.S. PATENT DOCUMENTS

| | | | | |
|---|---|---|---|---|
| 5,960,110 A | * | 9/1999 | Usami | 382/167 |
| 6,124,944 A | * | 9/1999 | Ohta | 358/1.9 |
| 5,966,507 A | * | 10/1999 | Lin | 358/1.9 |
| 6,038,373 A | * | 3/2000 | Matsumoto et al. | 358/1.9 |
| 6,118,547 A | * | 9/2000 | Tanioka | 358/1.9 |

* cited by examiner

Primary Examiner—Thomas D. Lee

(57) ABSTRACT

A method and apparatus to integrate a uniform bit-depth rasterizer and a non-uniform bit-depth print engine is disclosed. When using the non-uniform bit-depth print engine to print uniform bit-depth pixel data, undesirable printout due to incompatibility of the different bit-depths will result. Prior to forwarding of pixel data to the print engine, pixel data is linearized and halftoned. According to the preferred embodiment, to accomplish integration of the uniform bit-depth rasterizer and the non-uniform bit-depth print engine, some linearized components are scaled prior to halftoning. After halftoning, an appropriate number of most significant bits are discarded from the components which are scaled earlier to obtain effectively a non-uniform bit-depth pixel data.

8 Claims, 2 Drawing Sheets

Figure 1 PRIOR ART

METHOD AND APPARATUS FOR USING A RASTERIZER AND A PRINT ENGINE OF INCOMPATIBLE BIT-DEPTH REPRESENTATION

FIELD OF INVENTION

This invention relates to a method for printing using a rasterizer and a print engine of incompatible bit-depth and more particularly for printing using a uniform bit-depth PostScript raster image processor (RIP) in conjunction with a swath manager that requires print data comprising non-uniform bit-depth pixel data.

BACKGROUND

The use of color images in computer systems and computer based publishing systems is becoming increasingly popular. The use of color images is no longer limited to professionals using high-end computer systems. Instead, the reproduction of color images is quickly becoming a standard feature of personal computers used by all levels of computer users.

The popularity is due in part to the result of standards-based computer programs such as modules which implement the page description language (PDL) PostScript available from Adobe Systems Incorporated of Mountain View, California, U.S.A. The PostScript language has become an industry standard that serves as an intermediary between application packages, e.g., desktop publishing programs, and PDL-compatible reproduction equipment, such as a desktop printer. The application packages translate information for a page into PDL for transmission to a PDL-compatible desktop printer. The PDL-compatible printer includes an interpreter that converts the PDL code to low-level instructions that indicate to the printer how to render the text and graphics. The process of interpreting and rendering PDL is often performed within a raster image processor (RIP). The output of the RIP is pixel data which is of a uniform bit-depth.

An image to be printed on a page consists of picture elements, called pixels. The size of each pixel is dependent on the resolution of a printer. Each pixel can take on one of several different image values. For example, a color pixel is allocated a particular number of bits to each of the color components that make up the color pixel. For printing, one uses at least three color components, and most commonly four color components: C, M, Y and K to indicate the amounts of cyan, magenta, yellow and black colorant needed to reproduce the image on a particular printer. It is not uncommon to represent each of the components by an 8-bit value, for a total of 32 bits per pixel. It has been observed that not all 256 colorant levels (8 bits) per component are perceptually or measurably distinguishable. This inability to distinguish the 256 colorant levels indicates that a lower number of colorant levels will still produce images with sufficiently high quality. There exist techniques which reduce the number of bits per pixel to give a lower number of colorant levels.

Such reduction in the number of bits will result in great savings in memory requirements for storing a complete image in a printer. For example, to store a color image of a typical 11 by 8.5-inch page size, at a spatial resolution of 600 pixels per inch, with four color components per pixel and one byte (8 bits) per component requires a massive 134,640,000 bytes. This large memory requirement will increase the cost of a printer. It would be desirable to reduce the amount of memory needed to store such an image without losing a noticeable amount of image quality.

One of the techniques for reducing the number of bits is a technique known as halftoning. Halftoning uses a spatial representation of pixels of different shades to simulate a color or gray level, typically to approximate the desired color or gray level on a device that cannot represent the color or gray level directly.

Another factor that is important in printers is printing speed. Current printer throughput in terms of number of pages per minute still leaves a lot to be desired. Developers have gone to great length to improve printing speed. One of the methods for improving print speed is the use of a non-symmetric print engine. In such a print engine, the size of a black (K) dot is 4 times larger than the other (CMY) dots. This printing of larger K dots is employed to maximize black printing speed. By printing larger dots, it takes less dots and thus less time to print to cover a print area. With a larger black dot, it is also decided that only a binary value representation of 1 bit is required to represent the K component without significantly degrading print quality. This 1-bit bit-depth of black component further reduces the memory requirement in a printer. A 1-bit bit-depth will mean depositing a fixed amount of colorant such as ink at a particular point, or not depositing any colorant at that point.

Current Postscript RIPs are implemented in software which is generally owned and distributed by Adobe. This RIP software can be configured to produce an output pixel data which is of uniform CMYK bit-depth only. In other words, the same number of bits will represent all CMYK components. This uniform CMYK bit-depth output is incompatible with downstream non-uniform CMYK bit-depth software components such as a swath manager of a non-symmetric print engine. Take for example a swath manager which expects an input data of 1-bit K and 2-bit CMY bit-depths. There is a mismatch in the representation of the K component at the interface between the output of the RIP and the input of the swath manager. Assume that the RIP is configured to output pixel data of a uniform 2-bit CMYK bit-depth. The output of the RIP for the K component of any pixel will take on one of the values 00, 01, 10 and 11. The inventors have experimented with converting these 2-bit values to 1-bit values by using bit truncation or bit resampling at the swath manager. As the software implementing these RIPs is usually complex, modifications are not made to the software to implement the conversion. Modifications to such complex software will require extensive effort in testing and this extra testing effort increases product cycle time.

Bit truncation and bit resampling are best described by way of an example. Assuming the printing of a white-to-black ramp using the RIP and the swath manager, which are of incompatible bit-depths. Ideally, this white-to-black ramp will be printed with white on one end and black on the other with shades of progressively darker gray from the white end to the black end. The pixel K value on the white end will be 00. As the ramp progresses, some pixels will be 01. Further on, more and more pixels will be 01 until all pixels are 01. And yet further on, some pixels will have the K value of 10 until all pixels are 10. This distribution of pixels applies for pixels having a K value of 11. Eventually, at the black end, all pixels will have this K value of 11. A simple bit truncation removes the most significant bit of the 2-bit value. The 00→01→10→11 progression in pixel K value will end up with 1-bit values of 0, 1, 0, 1. Printing of the white-to-black ramp using such truncated pixel data in a 1-bit K print engine will result in an undesirable white-black-white-black double ramp instead.

Bit resampling involves processing of the pixel data with 2-bit K bit-depth to produce the required pixel data of 1-bit K bit-depth. This processing may involve performing steps similar to halftoning to convert the pixel data. Although the result achievable by using bit resampling may be better than that of using bit truncation, steps similar to halftoning is a time consuming process and the use of such a method will degrade the printing speed of a printer.

From the above, there is therefore a need for a method and apparatus to integrate a uniform CMYK bit-depth rasterizer and a non-uniform CMYK bit-depth print engine without imposing too much processing overhead in a printer to undesirably degrade printing speed.

SUMMARY

In accordance with the preferred embodiment of the invention, a method and apparatus are provided to integrate a uniform bit-depth rasterizer and a non-uniform bit-depth print engine.

The non-uniform bit-depth print engine expects to receive pixel data with the different components represented by different bit-depths. Prior to being forwarded to the print engine, pixel data is processed by a halftoning module in the rasterizer. The halftoning module outputs pixel data at a uniform bit-depth. This uniform bit-depth matches a component bit-depth of the print engine.

A print engine component whose bit-depth does not match the s uniform bit-depth of the halftoning module is identified. The values of this identified component in the pixel data are scaled prior to halftoning to limit their halftoned output values.

After halftoning of the scaled pixel data, appropriate bits are extracted from the values of the identified component to obtain the required non-uniform bit-depth pixel data.

This non-uniform bit-depth pixel data is used with the non-uniform bit-depth print engine, thus integrating a rasterizer and a print engine of incompatible bit-depths.

BRIEF DESCRIPTION OF DRAWINGS

The invention will be better understood with reference to the drawings, in which.

DETAILED DESCRIPTION OF THE PREFERRED EMBODIMENT

Figure 1:
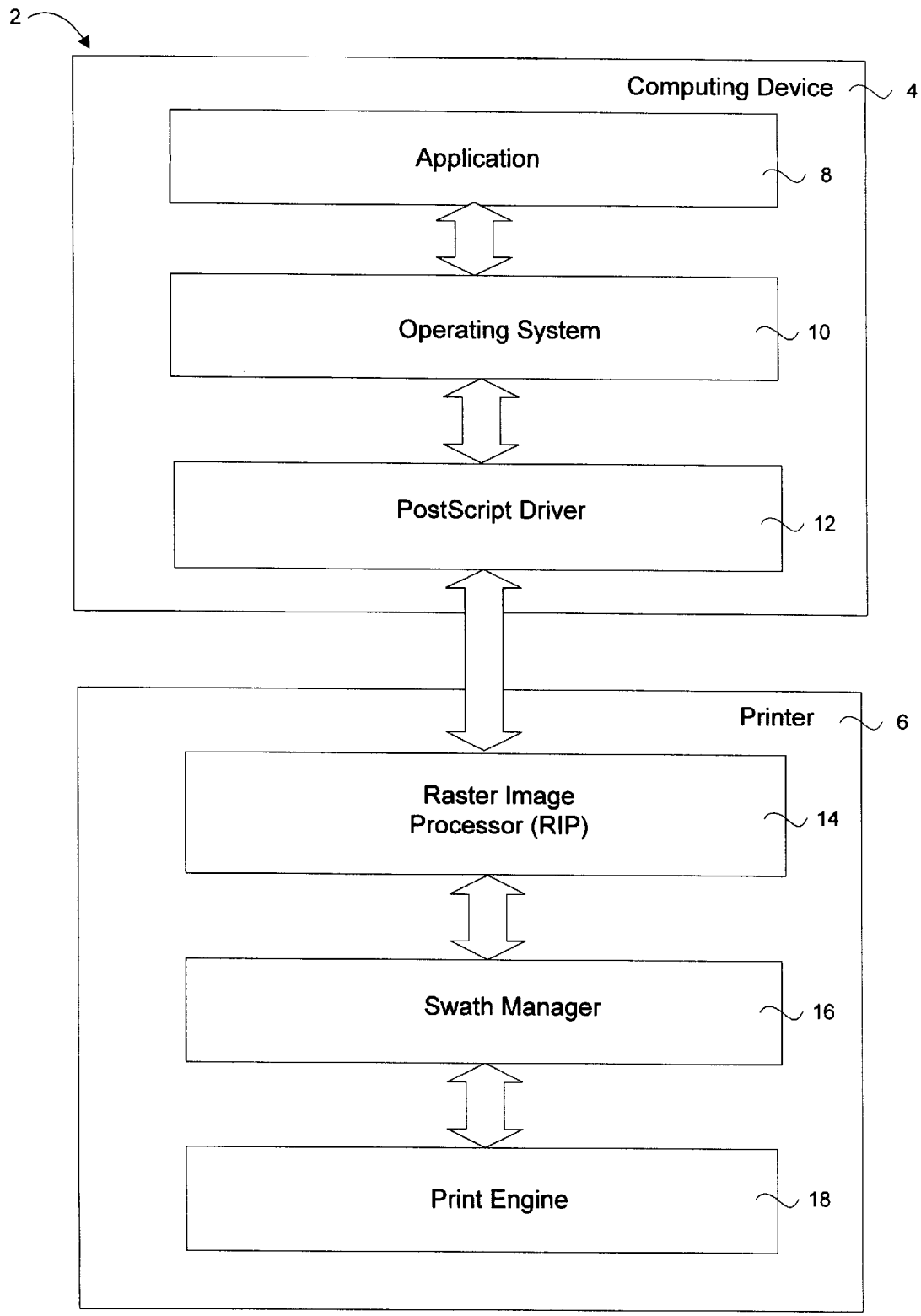
FIG. 1 is a prior art schematic diagram of software components of a PostScript printing system which reside in a computing device and a printer.

The software components 2 in a PostScript (PS) printing system are first described with reference to FIG. 1. This description of the components sets the context for describing the preferred embodiment according to the invention. The implementation of the invention is described later by highlighting changes required in some of the software components in FIG. 1.

The PS printing system 2 comprises software components that reside on a computing device 4 and a printer 6. The software components on the computing device are classified as an application 8, an operating system (OS) 10 and a PS driver 12. The application 8 is usually a desktop publishing software program that is suitable for incorporating text, graphics and other aspects of documents to be published. It is noted, however, that the benefits of the invention are not limited to use with an application whose primary purpose is to combine text and graphics. Thus, throughout the specification, the term "application" is defined to include not only desktop publishing software but also programs such as presentation, art, and drawing programs. These programs run on a processing unit (not shown) controlled by the OS 10. The OS 10 also controls resources such as memory (not shown) and input/output devices (not shown) in a computer system. The OS 10 shields the application 8 from device-specific drivers such as the PS driver 12. The application 8 needs only to deal with the OS 10. This shielding of the application 8 from the drivers makes the application 8 less susceptible to peculiarities of the different devices.

Using the application 8, an author creates the text, images, and graphics comprising a publication. In many cases, the data comprising a publication is also imported from one or more sources including, for example, illustration, image enhancement, word processing, and desktop publishing programs. After the input data comprising a publication have been entered, the author may send the data for printing on a printer.

During printing, the application 8 sends the data which defines the publication to the OS 10 for translation and forwarding to the PS driver 12. The PS driver 12 converts the data into instructions in a PS page description language (PDL) file. This PS driver 12 permits the computer device 4 to communicate with the printer 6. In most cases, the PS driver 12 typically performs only the higher-level data translation. This higher-level PS driver 12 then relies on lower-level drivers (not shown) to actually send the PS language file to the printer 6.

At the printer 6, an interpreter or raster image processor (RIP) 14 translates the instructions in the PostScript language file into dot or pixel data for printing on the printer 6. To translate the PS language file into a pixel data that is required by a print engine 18 of the printer 6, the RIP 14 communicates with a swath manager 16 to prime the swath manager 16 for performing appropriate intermediate data translation. In priming the swath manager 16, the RIP 14 sends an application requested print mode to the swath manager 16. The swath manager 16 initializes appropriate CMYK lookup tables (LUTs) in preparation for the intermediate data translation according to the print mode. These CMYK LUTs are used to linearize pixel data for printing on the print engine 18, which is usually non-linear. This method of compensation by linearizing pixel data is well known to those skilled in the art.

After the pixel data is linearized, halftoning is carried out on the pixel data to produce pixel data at a required CMYK bit-depth. The swath manager 16 then sends the halftoned pixel data to the print engine 18 for printing.

Figure 2:
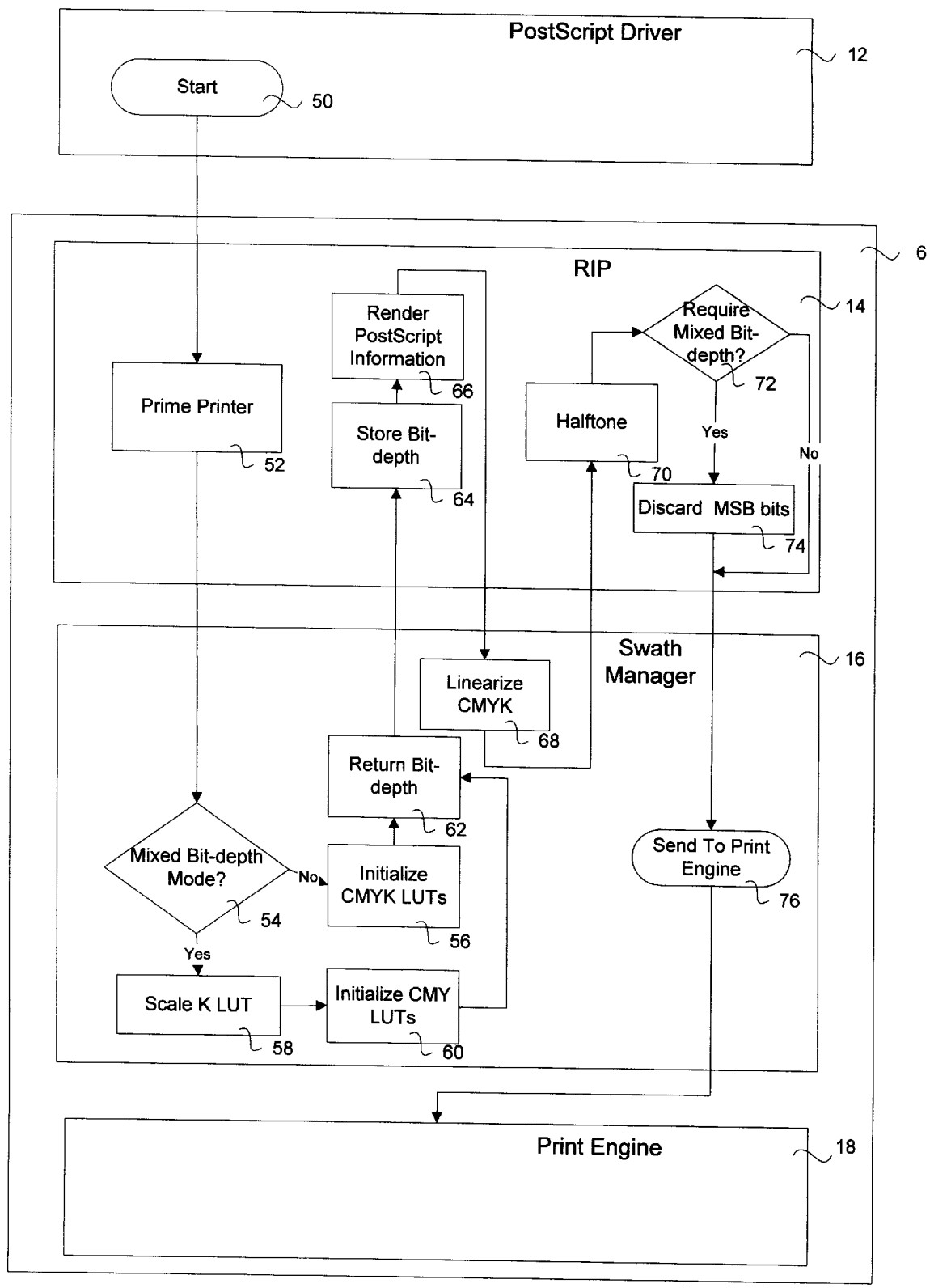
FIG. 2 is a flowchart illustrating the sequence of operation and method for integrating a uniform CMYK bit-depth RIP with a non-uniform CMYK bit-depth print engine in accordance with the present invention. The sequence is shown in the context of the software components in FIG. 1.

The description of the preferred embodiment is now described with the aid of FIG. 2. FIG. 2 shows a sequence of steps required in the PS printing system 2 to integrate a uniform CMYK bit-depth RIP 14 with a non-uniform CMYK bit-depth print engine 18.

The sequence starts in a START step 50, where the PS driver 12 sends a PS language file to the printer 6. The PS driver 12 also sends a print mode along with the PS language file to the printer 6. Assume that pixel data is represented by 8 bits per CMYK component, as is usually the case. The sequence proceeds to a PRIME PRINTER step 52. In this step 52, the RIP 14 sends the print mode to the swath manager 16 by making an application programming interface (API) call to the swath manager 16. An example of this API call is the RedCMInitColorLUTs API call which is required by Adobe for a swath manager to interwork with an Adobe supplied RIP. The sequence next proceeds to a MIXED BIT-DEPTH MODE? step 54, where the swath manager 16 checks if the print mode is a mode which requires the print engine 18 to operate in a mixed bit-depth mode. If the swath manager 16 determines that no mixed bit-depth operation is required for the requested print mode, the sequence proceeds to a INITIALIZE CMYK LUTS step 56. In this step 56, the swath manager 16 selects individual CMYK LUTs appropriate for the print mode. The preparation and selection of CMYK LUTs is well known to those skilled in the art.

Steps subsequent to the MIXED BIT-DEPTH MODE? step is best explained by way of an example of a non-uniform CMYK bit-depth print engine. Assume that this non-uniform CMYK bit-depth print engine 18 requires that CMY components be represented by M bits and the K component by N bits, where N is smaller than M.

If the print mode requires the print engine 18 to operate in a mixed bit-depth mode as determined in the MIXED BIT-DEPTH MODE? step 54, the swath manager 16 determines a bit-depth to be used by the RIP 14 when the RIP 14 carries out halftoning in a halftoning module. For the mixed bit-depth print engine 18 in the example above, the swath manager 16 selects a M-bit output bit-depth for the halftoning module in the RIP 14. The swath manager 16 selects an output of M-bit bit-depth as M-bits are used to represent the largest number of components in the print engine.

If mixed bit-depth mode is required, the sequence proceeds to a SCALE K step 58, where the swath manager 16 selects an appropriate K LUT. The swath manager 16 scales the values in this K LUT to produce a scaled K LUT. In the preferred embodiment, scaling the values in the K LUT is attained by multiplying each value in the K LUT by the following formula:

$$\frac{2^N - 1}{2^M - 1}$$

The sequence next proceeds to an INITIALIZE CMY LUTS step 60, where the swath manager 16 selects the other CMY LUTs in accordance with the print mode. The use of these initialized CMYK LUTs will be described later.

Regardless of whether mixed bit-depth mode is required, the sequence proceeds to a RETURN BIT-DEPTH step 62 after the INITIALIZE CMYK LUTS step 56 or INITIALIZE CMY LUTS step 60. In the RETURN BIT-DEPTH step 62, the swath manager 16 informs the RIP 14 of the earlier selected bit-depth required of the halftoning module in the RIP 14. The RIP 14 stores this bit-depth requirement in a STORE BIT-DEPTH step 64. The RIP 14 next proceeds to interpret and render the instructions in the PS language file which was received from the PS driver 12 earlier in a RENDER POSTSCRIPT INSTRUCTIONS step 66. The RIP 14 transforms the instructions in the PS language file into pixel data. This pixel data is represented in 8-bit CMYK bit-depth. The RIP 14 groups pixel data in swaths and sends them, swath by swath, to the swath manager 16. The sequence next proceeds to a LINEARIZE CMYK step 68 in the swath manager 16. In this LINEARIZE CMYK step 68, the swath manager 16 uses the earlier initialized CMYK LUTs to correct the non-linear relationship between the non-corrected input pixel data and the perceived output as printed by this particular print engine 18. In an Adobe RIP, the RIP 14 makes a call to the RedCMCMYKConvert API call to correct the non-linear relationship. This correction may also include colorant drop volume compensation which is again well known to those skilled in the art. After correction, the swath manager 16 sends the corrected pixel data back to the RIP 14 for halftoning. This corrected or linearized pixel data is still represented by an 8-bit CMYK bit-depth.

The sequence next proceeds to a HALFTONE step 70, where the RIP 14 performs halftoning to reduce the number of bits required in the corrected pixel data. The output of halftoning the corrected pixel data is halftoned pixel data which is defined by a uniform M-bit CMYK bit-depth according to that requested earlier by the swath manager 16 in the RETURN BIT-DEPTH step 62. The sequence proceeds to a REQUIRE MIXED BIT-DEPTH? step 72 to check if mixed bit-depth mode is required by the swath manager 16. If a mixed bit-depth mode is not required as determined by the REQUIRE MIXED BIT-DEPTH? step 72, the RIP 14 sends the uniform M-bit CMYK bit-depth pixel data to the swath manager 16. If however, mixed bit-depth is required as determined in the REQUIRE MIXED BIT-DEPTH? step 72, the sequence proceeds to a DISCARD MSB BITS step 74. In this DISCARD MSB BITS step 74, the RIP 14 truncates the K component by discarding the (M−N) most significant bits from the K component of each pixel data. This bit truncation further reduces the number of bits representing the K component to N bits. The RIP 14 sends the non-uniform CMYK bit-depth pixel data to the swath manager 16, swath by swath. In an Adobe RIP, the RIP 14 makes a RedSMReturnSwath API call to send the pixel data to the swath manager 16.

The sequence ends in a SEND TO PRINT ENGINE step 76, where the swath manager 16 sends the non-uniform CMYK bit-depth pixel data to the print engine 18 for printing.

While the present invention has been shown and described with reference to the foregoing operational principles and preferred embodiment, it will be apparent to those skilled in the art that other changes in form and detail may be made.

As an example, for a print engine that is of uniform bit-depth but requires certain limits in a component, for example in the K component, the DISCARD MSB BITS may be dropped from the sequence.

As a further example, in the preferred embodiment only K is of a different bit-depth of N bits. This invention could well be applied to a print engine where more than one component is of a N-bit bit-depth. In fact, different CMYK bit-depths may be supported. For example, assuming that C and M components are required to be represented by M bits and the Y component by N1 bits and the K component by N2 bits. The swath manager 16 on determining that mixed bit-depth mode is required in the MIXED BIT-DEPTH MODE? step 54 can scale the Y and K LUTs according to the formula given earlier. Subsequently the RIP 14 can discard (M−N1) MSB bits from the Y component and (M−N2) MSB bits from the K component in the DISCARD MSB BITS step 74.

Also, if LUTs are not shared as is the case in the preferred embodiment, but is specific for a print mode of a particular print engine, the values of the LUTs can be pre-scaled during the preparation of the LUTs.

The RIP 14 and swath manager 16 are described to be separate entities. In actual code implementation, there may not be any real physical boundary between the software components. The RIP 14 and swath manager 16 are split only along logical lines based on the functions they perform. Each of these software components is implemented as a set of functions. It is debatable as to whether an API call, such as the RedCMlnitColorLUTs API call, rightfully belongs to the RIP 14 or swath manager 16. It should therefore not be construed as a limitation when a function, such as a function implementing the LINEARIZING CMYK step 62, is described to be performed by the swath manager.

We claim:

1. A method for printing an image defined by an input pixel data in a printing subsystem, the printing subsystem having a print engine which has a plurality of colored components of non-uniform bit-depths and a rasterizer which generates pixel data at a uniform output bit-depth, the method comprising the steps of:

scaling values of a component lookup table corresponding to a colored component whose bit-depth does not match the output bit-depth;

correcting values in the input pixel data corresponding to the colored component using the scaled component lookup table to cater to printing non-linearity associated with the print engine;

halftoning the corrected pixel data to produce a halftoned pixel data having the uniform output bit-depth; and extracting appropriate bits in the colored component in the uniform bit-depth halftoned pixel data to produce a non-uniform bit-depth pixel data for use with the non-uniform bit-depth print engine.

2. A printing method according to claim 1, wherein the non-uniform bit-depth print engine comprises M-bit CMY components and a N-bit K component and wherein the step of scaling values comprises multiplying values of the component lookup table by:

$$\frac{2^N - 1}{2^M - 1}$$

3. A printing method according to claim 2, wherein the step of extracting appropriate bits comprises truncating the (M–N) most significant bits from the K component values of the uniform bit-depth halftoned pixel data.

4. A printing subsystem for printing an image defined by pixel data on a printer that has a print engine having a plurality of colored components of non-uniform bit-depths, the printing subsystem comprising:

means for scaling values of a component lookup table corresponding to a colored component whose bit-depth does not match the output bit-depth;

means for correcting values in the input pixel data corresponding to the colored component using the scaled component lookup table to cater to printing non-linearity associated with the print engine;

means for halftoning the corrected pixel data to produce a uniform bit-depth halftoned pixel data; and means for extracting appropriate bits in the colored component in the halftoned pixel data to produce a non-uniform bit-depth pixel data for use with the non-uniform bit-depth print engine.

5. A program storage device readable by a computing device, tangibly embodying a program of instructions, executable by the computing device to perform the method for printing an image defined by an input pixel data in a printing subsystem, the printing subsystem having a print engine which has a plurality of colored components of non-uniform bit-depths and a rasterizer which generates pixel data at a uniform output bit-depth, the method comprising:

scaling values of a component lookup table corresponding to a colored component whose bit-depth does not match the output bit-depth;

correcting values in the input pixel data corresponding to the colored component using the scaled component lookup table to cater to printing non-linearity associated with the print engine;

halftoning the corrected pixel data to produce a halftoned pixel data having the uniform output bit-depth; and extracting appropriate bits in the colored component in the uniform bit-depth halftoned pixel data to produce a non-uniform bit-depth pixel data for use with the non-uniform bit-depth print engine.

6. A method for changing a first bit-depth of a colored component of at least one pixel of an input pixel data defining an image to a second bit-depth, the method comprising:

scaling values of a component lookup table corresponding to the colored component;

correcting values in the input pixel data corresponding to the colored component by using the scaled component lookup table to cater to printing non-linearity associated with a print engine;

halftoning the corrected pixel data to produce a halftoned pixel data; and extracting appropriate bits of the colored component in the halftoned pixel data to obtain the colored component at the second bit-depth.

7. A method according to claim 6, wherein the first bit-depth is M bits and the second bit-depth is N bits and wherein the step of scaling values comprises multiplying values of the component lookup table by:

$$\frac{2^N - 1}{2^M - 1}$$

8. A method according to claim 7, wherein the colored component is a K component in the input pixel data having pixel values comprising CMYK components at the first bit-depth.

* * * * *